UNITED STATES PATENT OFFICE.

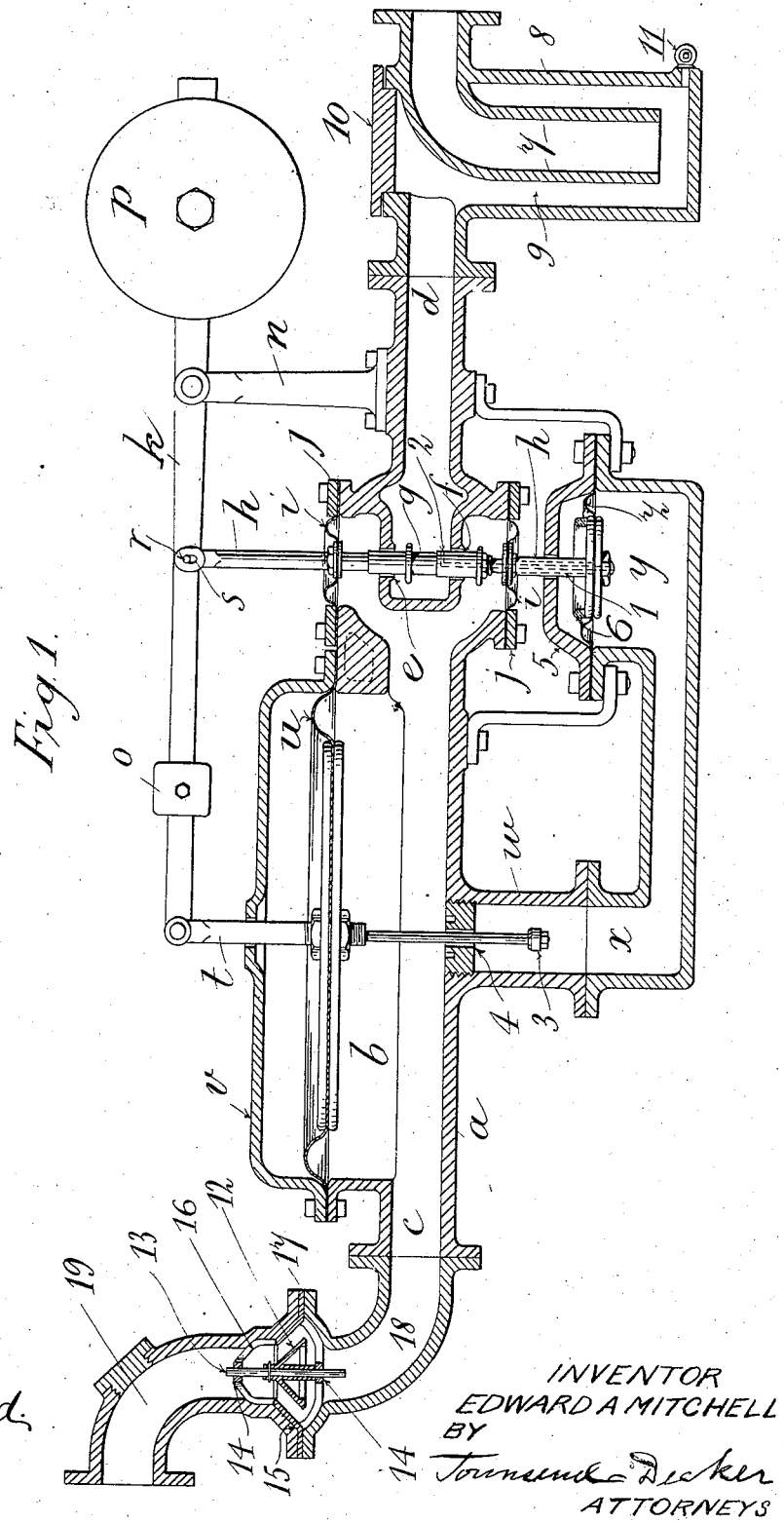

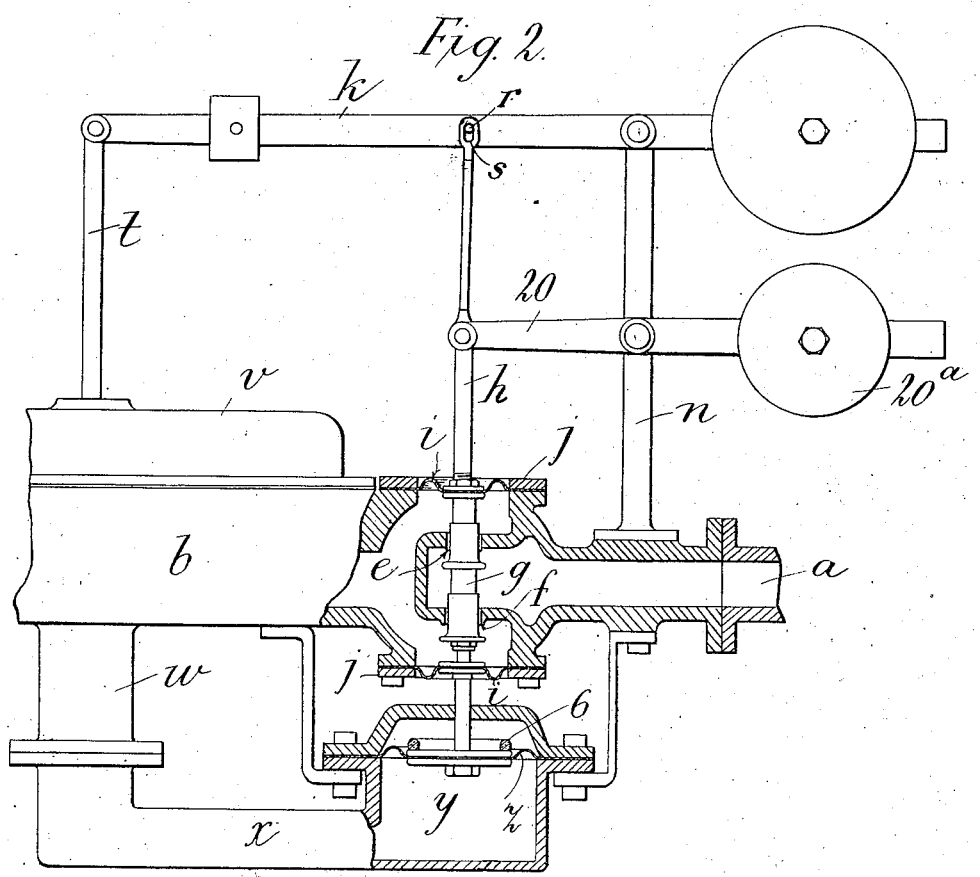

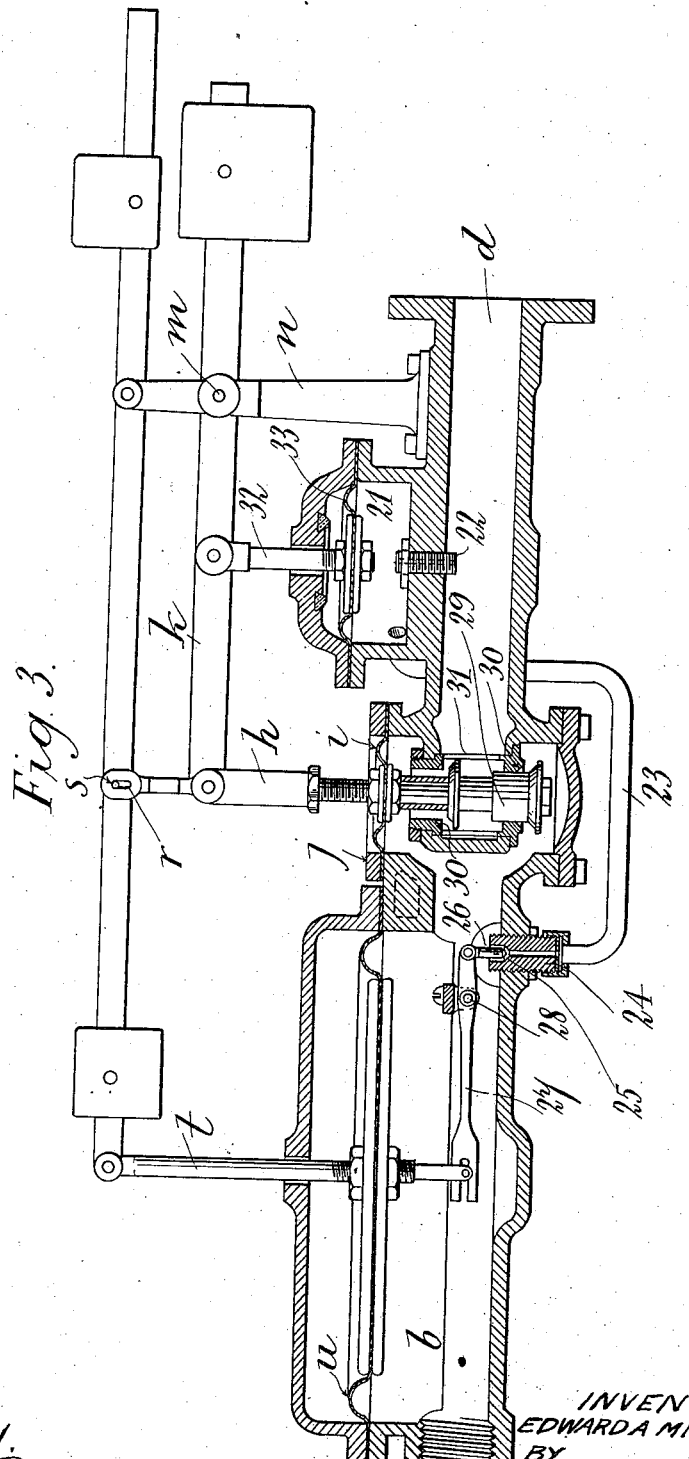

EDWARD ALBERT MITCHELL, OF LONDON, ENGLAND.

PRESSURE-CONTROLLING SYSTEM.

1,174,339.   Specification of Letters Patent.   Patented Mar. 7, 1916.

Application filed May 27, 1912. Serial No. 699,855.

*To all whom it may concern:*

Be it known that I, EDWARD ALBERT MITCHELL, a subject of the King of Great Britain and Ireland, residing at London, England, have invented Improvements in or Relating to Pressure-Controlling Systems, of which the following is a specification.

This invention relates to systems wherein, as for the distribution of high pressure fluid such as gas or air, a reducing valve is employed to control the flow of fluid from one part of the system to another lower pressure part automatically in accordance with the consumption of fluid, or pressure variation due to an equivalent cause.

The invention includes among its objects the provision of simplified means for operating the main or reducing valve, distinguished from existing arrangements in that the valve is directly moved toward or to closed position by a low pressure regulator and is thereafter closed or maintained closed, by high pressure fluid independently of the low pressure regulator until such time as the latter moves to a position where it is desired the interrupted supply shall be continued again.

Another object of the invention is to provide an arrangement whereby, in a system of the kind referred to, a low pressure regulator serves, when moved to its extreme position with increase of pressure above the normal, to close the outlet of an operating chamber, associated with the pressure reducing valve, and permit the accumulation in such chamber of fluid at the full high pressure of the system which will act to hold the valve closed, the disposition of the parts being such that no matter to what extent the pressure on the high pressure side of the system might be increased, no leakage could occur to the low pressure side, a vent valve being employed which requires to be opened against the high pressure fluid.

With these and other objects, the invention consists in the arrangements and combinations of parts hereinafter claimed and now about to be described with reference to the accompanying drawings Figure 1 of which is a sectional elevation of a constructional form of regulator adapted to supply service pipes with say gas at a pressure of two ounces to the square inch reduced from a pressure of fifty pounds per square inch for example, the parts of the regulator being in a mid or working position, Fig. 2 is an elevation of a modification. Fig. 3 is a view similar to Fig. 1 of another constructional form of the apparatus.

As shown in Fig. 1, a casing $a$ is employed having a diaphragm compartment $b$ and low pressure outlet $c$ at one end separated from a high pressure inlet $d$ at the other end by the seatings $e$, $f$ of an ordinary balanced pressure reducing valve $g$. The stem $h$ of this valve $g$ may protrude in both directions above and below the casing part $a$ and be connected thereto in a fluid tight manner, as by means of flexible diaphragms $i$ and clamping rings $j$, the upper extremity having a loose connection with a weighted lever $k$. This lever is shown as pivoted at $m$ to a pillar $n$ with weights $o$ and $p$ at opposite sides thereof, the loose connection between the lever and the valve stem $h$ being shown as constituted by a slot $r$ in the latter co-acting with a pin $s$ on the lever. The lever $k$ is pivotally secured at one end to a stem $t$ connected to the diaphragm $u$ of the low pressure regulator, the said diaphragm being clamped to the top of the compartment $b$ by a protecting cover $v$. Co-axially with this diaphragm $u$, and beneath the bottom of the compartment $b$ is a branch $w$ adapted to be connected to the branch $x$ of a high pressure chamber $y$ coaxial with the pressure reducing valve $g$. The lower end of the stem $h$ of the valve $g$ extends into the chamber $y$ and is connected in a fluid tight manner thereto, as by a flexible diaphragm $z$, a passage 1 and lateral port 2 in the stem $h$ serving to permit fluid from the high pressure inlet $d$ to enter the chamber $y$. Communication between the diaphragm compartment $b$ or low pressure side of the apparatus and the chamber $y$ is controlled by a vent valve 3 movable with the diaphragm $u$ and adapted to be advanced toward a seat 4 as the diaphragm moves upwardly and to be held against such seat by fluid in the high pressure chamber $y$.

The diaphragm $z$ that closes the chamber $y$ may be clamped in position by a cover 5, and in order that a tight joint may be made where the valve stem passes through it, when the chamber $y$ contains an accumulated plenum, a ring 6 of resilient material, such as rubber, may be interposed, movable say with the diaphragm in such wise that just prior to closure of the valve $g$, this ring 6 forms a joint surrounding the stem $h$. Such jointing means need not necessarily be employed with a diaphragm as shown except as a precautionary measure for service in case of say a rupture of the latter, or of leakage of gas therethrough, but it is essential if, in lieu of a diaphragm, means be employed which are not absolutely fluid tight in character.

The inlet $d$ to the apparatus may be provided with a drip box for the accumulation of liquid of condensation, such drip box being shown as comprising concentrically arranged parts 7, 8, forming a return passage 9 at an angle to the inlet $d$, the outermost part 8, which may have an inspection cover 10, being fitted with a blow off cock 11.

The outlet $c$ of the apparatus may be provided with a safety valve so that in the event of fluid at high pressure obtaining, for any reason, access to the outlet, a continuance of such supply is prevented. This may comprise a valve 12 so loaded as to normally tend to occupy an open position, being shown as acted upon by gravity and secured to a stem 13 free to slide in guides 14 co-axial with a seat 15 in a cage 16 having a flange 17 to enable it to be clamped between the flanges of two pipes 18, 19 of the apparatus. Should the regulater fail, any sudden increase in the flow of gas will act to move the valve to its seat where it will be held until the system is put in proper condition again.

The operation of the system is as follows:—Assuming that the low pressure is that for which the regulator is set, then the diaphragm $u$ will occupy some such position as that shown where the valve $g$ is more or less open and the vent valve 3 also, so that the high pressure fluid that leaks into the chamber $y$ by way of the passage 1 and port 2 in the stem $h$ of the valve $g$ will be dissipated in the low pressure part of the system. If however the pressure in the low pressure part of the system increases, then the diaphragm $u$ of the regulator will rise and in so doing rock the lever $k$ and move the valve $g$ nearer to its closed position, this continuing, if the pressure continues to rise, until the vent valve 3 is closed. When this happens, the fluid in the high pressure chamber $y$ accumulates and gradually completes the closure of the valve $g$, the loose connection $r$, $s$ between the stem $h$ and lever $k$ permitting of this independent movement. When the pressure of the low pressure part of the system falls sufficiently to render it necessary to again supply fluid thereto, the diaphragm $u$ will descend, the loose connection $r$, $s$ being such as to allow this, and open the vent valve 3 whereupon the pressure in the chamber $y$ will be reduced and the valve $g$ permitted to open.

In the arrangement described, the balancing of the regulator diaphragm $u$, with its associated parts, and the pressure reducing valve $g$ and its attachments is effected conjointly by the weight system $o, p$. When however the governor is in such a condition that the vent valve 3 is closed thereby preventing the diaphragm $u$ rising further, and the reducing valve $g$ is being kept closed by the accumulated fluid pressure in the chamber $y$, the lever $k$ is, by reason of the lost motion connection at $r, s$, relieved of the weight of such valve $g$ and associated parts, with the result that the normal balance of the governor is sensibly disturbed, thus necessitating a greater drop in pressure at the low pressure side of the governor before the diaphragm $u$ will descend, than would otherwise be the case. In order to prevent such an occurrence, the diaphragm $u$ and the valve $g$ may be balanced independently of each other so that the conditions remain practically constant irrespective of the position that the valve occupies. This may be effected in the case of the example just described by the modification of parts shown in Fig. 2 where a supplementary lever 20 is pivoted say to the pillar $n$ and connected to the stem $h$ of the valve $g$ and also the lever $k$, the said supplementary lever 20 being independently loaded as by a counterweight $20^a$. From this it will be seen that the work which the diaphragm $u$ has to do to move the independently balanced reducing valve $g$ toward its closed position is practically negligible and that a smaller drop in pressure in the chamber $b$, compared with that of the first construction, will be necessary to produce the automatic return movement of the diaphragm $u$ in order to open the vent valve 3.

In some cases the high pressure chamber and the vent valve therefor, in lieu of being co-axial respectively with the pressure reducing valve and diaphragm of the regulator, may be arranged out of alinement therewith. Such an arrangement is shown in Fig. 3. Here a high pressure chamber 21 is located above the inlet $d$ and is placed in communication with such inlet through a removable control nipple 22. A by-pass pipe 23 connects this chamber to another nipple 24 having a seat 25 at its upper end for a vent valve 26 and extending into the diaphragm compartment $b$. The vent valve 26 is operated from the diaphragm $u$ through a double-armed lever 27 movable about a stationary fulcrum 28. The pressure reducing valve 29, which may have its seatings 30 formed in a removable lantern 31 is, as before, connected, through a loose joint $r, s$ with the lever $k$. The supplementary lever 20 in addition to being connected to the stem $h$ of the valve 29 is similarly connected to a stem 32 protruding upwardly from the diaphragm 33 of the high pressure chamber 21.

What I claim is:—

1. Fluid pressure reducing apparatus comprising a reducing valve separating a high pressure inlet from a low pressure outlet, a chamber in permanent communication with the high pressure inlet and having a stationary outlet passage communicating with said low pressure outlet, a low pressure regulator connected through a loose connection to said pressure reducing valve, a vent valve operated by said low pressure regulator and arranged to open and close the communication between the said low pressure outlet and stationary outlet passage, means associated with said chamber for holding the reducing valve in its closed position when said vent valve is closed, means for balancing said reducing valve and independent balancing means for said low pressure regulator.

2. Fluid pressure regulating apparatus comprising a pressure reducing valve separating a high pressure inlet from a low pressure outlet, a chamber, associated with means for holding the pressure reducing valve closed, in permanent communication with the high pressure inlet and having an independent outlet, a vent valve controlling such outlet and a low pressure regulator operatively connected to both the pressure reducing valve and the vent valve, the arrangement being such that when the vent valve is closed, the high pressure fluid accumulates in the operating chamber and holds the pressure reducing valve closed.

3. Fluid pressure regulating apparatus comprising a pressure reducing valve separating a high pressure inlet from a low pressure outlet, an operating chamber, associated with means for closing the pressure reducing valve, in permanent communication with the high pressure inlet and having an independent outlet, a vent valve controlling such outlet and a low pressure regulator operatively connected to both the pressure reducing valve and the vent valve, the arrangement being such that when the vent valve is closed, the high pressure fluid accumulates in the operating chamber and effects closure of the pressure reducing valve.

4. Fluid pressure regulating apparatus comprising a pressure reducing valve separating a high pressure inlet from a low pressure outlet, a chamber, associated with means for holding the pressure reducing valve closed, in permanent communication with the high pressure inlet and having an independent outlet, a vent valve controlling such outlet and a low pressure regulator operatively connected to both the pressure reducing valve and the vent valve, the arrangement being such that when the vent valve is closed, the high pressure fluid accumulates in the operating chamber and holds the pressure reducing and vent valves closed.

5. In fluid pressure regulating apparatus, a pressure reducing valve, a low pressure regulator operatively connected to the pressure reducing valve through articulated members having lost motion between them, means subject to the fluid at the high pressure side of the reducing valve adapted to close the latter and means controlled by the low pressure regulator adapted to render the aforesaid valve closing means operative.

6. In fluid pressure regulating apparatus, a pressure reducing valve, an operating chamber adapted to receive fluid under pressure, means subject to the fluid in such chamber operatively connected to the reducing valve and means adapted to form a fluid tight joint between the chamber and the valve operating means just prior to closing of the reducing valve.

7. In fluid pressure regulating apparatus, a pressure reducing valve, a low pressure regulator, means operatively connecting the moveable elements of the said regulator and valve and means for balancing the said movable elements independently.

8. In fluid pressure regulating apparatus, a pressure reducing valve, a high pressure chamber, a low pressure regulator, a vent valve for the high pressure chamber, means for producing simultaneously movement of the pressure reducing and vent valves with movement of the regulator, and means associated with the high pressure chamber adapted to produce an independent movement of the pressure reducing valve alone.

9. In fluid pressure regulating apparatus, a pressure reducing valve, a high pressure chamber, a low pressure regulator, a vent valve for the high pressure chamber, means operatively connecting the regulator, vent valve and high pressure valve, means for balancing the weight of the said operatively connected members, means associated with the high pressure chamber adapted to produce an independent movement of the pressure reducing valve alone and means for balancing the weight of the pressure reducing valve independently of the other balancing means.

10. Fluid pressure regulating apparatus comprising a reducing valve separating a high pressure inlet from a low pressure outlet, a chamber in permanent communication with the high pressure inlet and having an independent stationary outlet communicating with said low pressure outlet, a diaphragm associated with said chamber so as to be subject to the action of the high pressure fluid therein and connected to and adapted to hold the reducing valve closed when the outlet from said chamber is closed, a vent valve controlling the outlet from said chamber, a low pressure regulator adapted to open and close said vent valve and a loaded lever external to the valve casing, chamber and low pressure regulator, and connected to said low pressure regulator and also through a loose connection to said reducing valve.

11. Fluid pressure reducing apparatus comprising a reducing valve separating a high pressure inlet from a low pressure outlet, a chamber in permanent communication with the high pressure inlet, a stationary outlet passage between the said chamber and the said low pressure outlet, a low pressure regulator, a vent valve operated by said low pressure regulator and arranged to open and close said outlet passage, a diaphragm associated with said chamber and adapted to be operated by the high pressure fluid pressure therein, when the vent valve is closed, to close the reducing valve and hold it closed, a loaded external lever connected to said low pressure regulator and through a lost motion device to said reducing valve and a separate loaded external lever for independently balancing said reducing valve.

Signed at London, England, this 15th day of May, 1912.

EDWARD ALBERT MITCHELL.

Witnesses:
R. N. WESTCOURT,
H. D. JAMESON.